(12) United States Patent
Pieterse et al.

(10) Patent No.: US 7,119,325 B2
(45) Date of Patent: Oct. 10, 2006

(54) SYSTEM AND METHOD FOR MONITORING ENVIRONMENTAL EFFECTS USING OPTICAL SENSORS

(75) Inventors: Jan-Willem Pieterse, San Jose, CA (US); Hoang Nguyen, Livermore, CA (US); Rosemary O. Abriam, Livermore, CA (US); Andrew H. Cordes, San Jose, CA (US)

(73) Assignee: Bookham Technology PLC, (GB)

( * ) Notice: Subject to any disclaimer, the term of this patent is extended or adjusted under 35 U.S.C. 154(b) by 193 days.

(21) Appl. No.: 10/766,306

(22) Filed: Jan. 27, 2004

(65) Prior Publication Data

US 2004/0245441 A1 Dec. 9, 2004

Related U.S. Application Data

(60) Provisional application No. 60/442,998, filed on Jan. 27, 2003.

(51) Int. Cl.
*G02B 6/00* (2006.01)
(52) U.S. Cl. .............. 250/227.14; 356/73.1; 356/477; 385/12
(58) Field of Classification Search .......... 250/227.14–227.18; 356/73.1, 477–482; 385/12
See application file for complete search history.

(56) References Cited

U.S. PATENT DOCUMENTS

| | | | |
|---|---|---|---|
| 5,179,420 A * | 1/1993 | So et al. ............... 356/73.1 |
| 5,401,956 A | 3/1995 | Dunphy et al. ........ 250/227.18 |
| 5,513,913 A | 5/1996 | Ball et al. ................ 374/120 |
| 5,684,297 A | 11/1997 | Tardy et al. ........... 250/227.14 |
| 5,723,857 A | 3/1998 | Underwood et al. ... 250/227.14 |
| 5,748,312 A | 5/1998 | Kersey et al. ............. 356/345 |
| 5,798,521 A | 8/1998 | Froggatt ................ 250/227.19 |
| 5,818,585 A | 10/1998 | Davis et al. ............... 356/345 |
| 5,861,970 A * | 1/1999 | Tatham et al. ............. 398/150 |
| 6,204,920 B1 | 3/2001 | Ellerbrock et al. ......... 356/345 |
| 6,417,507 B1 | 7/2002 | Malvern et al. ........ 250/227.14 |
| 6,448,551 B1 | 9/2002 | Kersey .................. 250/227.14 |
| 6,492,636 B1 | 12/2002 | Chen et al. ............. 250/227.14 |

OTHER PUBLICATIONS

Bai'ou Guan et al., "An active demodulation system for multiplexed FBG sensors," Proceedings of SPIE vol. 4357 (2001) pp. 13-16.

* cited by examiner

*Primary Examiner*—Stephone B. Allen
(74) *Attorney, Agent, or Firm*—Morrison & Foerster LLP

(57) ABSTRACT

An apparatus and method for determining a physical parameter affecting an optical sensor or a number of sensors in a network. The apparatus uses a narrow linewidth source at an emission wavelength $\lambda_e$ and an arrangement for varying the emission wavelength $\lambda_e$ of the radiation. An analysis module with curve fitting is used to generate a fit to the response signal obtained from the optical sensor. The physical parameter is determined form the fit rather than from the response signal. The apparatus can be employed with Bragg gratings, etalons, Fabry Perot elements or other optical sensors.

20 Claims, 3 Drawing Sheets

SYSTEM AND METHOD FOR MONITORING ENVIRONMENTAL EFFECTS USING OPTICAL SENSORS

RELATED APPLICATIONS

This application claims priority from provisional application 60/442,998 filed on Jan. 27, 2003.

FIELD OF THE INVENTION

The present invention relates generally to environmental monitoring systems and methods that employ optical sensors such as Fiber Bragg Gratings (FBGs) whose Bragg wavelength ($\lambda_B$) varies as a function of the environmental effects being monitored.

BACKGROUND OF THE INVENTION

A number of optical sensors including respond to environmental changes by varying a property of an incident radiation. Some example properties that can be varies are transmittance, reflectance, absorbance or polarization of the incident radiation. As a result, systems for monitoring environmental effects using optical sensors such as Fabry-Peron elements and, even more so, Fiber Bragg Gratings (FBGs) have received considerable attention. FBGs are regions in optical fibers where the refractive index is varied in accordance to a certain pattern. Specifically, an FBG has a grating pitch $\Lambda$ and an effective refractive index n that define a Bragg wavelength $\lambda_B$ at which radiation is reflected by the FBG in accordance with the following equation:

$$\lambda_B = 2n\Lambda.$$

Since pitch $\Lambda$ and effective index n are very sensitive to changes in environmental effects such as temperature, pressure, strain, vibration, acoustics, etc., FBGs are effective in monitoring such changes. Consequently, numerous prior art systems teach to determine environmental changes directly from variations in Bragg wavelength $\lambda_B$ using different systems and various operation modalities. For example, the reader is referred to U.S. Pat. No. 5,513,913 to Ball et al. for a description of an active operation mode and to U.S. Pat. No. 5,748,312 to Kersey for a description of time domain reflectometry with modulated signal. Of further interest are U.S. Pat. Nos. 5,684,297; 5,723,857; 5,798,521; 6,448,551 and 6,492,636.

Several prior art systems designed to measure stress and temperature variations in mechanical structures employ a fiber network with a number of FBGs at locations where these variations are to be monitored. These systems use a broadband light source for supplying radiation to the FBGs. The reflected portions of the radiation corresponding to the Bragg wavelengths of the FBGs are detected with the aid of a tunable filter. Davis et al. teaches an exemplary system of this kind in U.S. Pat. No. 5,818,585.

Unfortunately, the use of broadband light sources and tunable detectors incurs a number of disadvantages. First, since broadband sources intrinsically cover a wide emission spectrum they tend to consume a lot of energy. Second, such sources are unable to provide high radiation intensities within the narrow wavelength windows to which the Bragg wavelengths are confined. Hence, the intensities of the reflected portions tend to be low. Third, tunable filters tend to have wide and difficult to control passbands. Thus, they are not well suited for precisely monitoring Bragg wavelengths that are very narrow band. This situation is aggravated in cases where the Bragg wavelengths shift quickly and/or by small amounts due to correspondingly rapid or small variations of the environmental factors. Finally, systems using broadband sources tend to be complex and expensive.

To overcome some of the disadvantages associated with broadband sources U.S. Pat. No. 5,401,956 to Dunphy et al. teaches a diagnostic system for fiber grating sensor using tunable light sources. The system scans the light sources across a predetermined wavelength range and illuminates each sensor. This system can operate in a transmission or reflection mode. More recently, U.S. Pat. No. 6,204,920 to Ellerbrock et al. entitled Optical Fiber Sensor System teaches the use of one tunable light source, e.g., an LED and a tunable etalon, for delivering light to all sensors. Still more recently, U.S. Pat. No. 6,417,507 to Malvern et al. entitled "Modulated Fibre Bragg Grating Strain Gauge Assembly for Absolute Gauging of Strain" discloses the use of tunable light sources and frequency modulation to determine absolute direction and magnitude of strain from a ratio of reflected intensity values 1f:2f, where f is the modulation frequency.

Despite these advances, problems associated with precise monitoring of light reflected at Bragg wavelengths that are very narrow band and fluctuate due to environmental perturbations and system instabilities remain.

OBJECTS AND ADVANTAGES

In view of the shortcomings of the prior art, it is a primary object of the invention to provide an apparatus and method for determining physical parameters such as temperature, pressure and strain in an efficient manner using optical sensors, such as Bragg gratings, and a scanned or swept light source. More specifically, it is an object of the invention to adapt the detection and analysis of the radiation from the optical sensor that is affected by the physical parameters to enable a more efficient and accurate determination of the physical parameters.

These and other objects and advantages of the invention will become apparent to the reader upon reviewing the following specification.

SUMMARY OF THE INVENTION

This invention provides an apparatus for determining a physical parameter affecting an optical sensor or a number of sensors in a network. The apparatus has a source for emitting a radiation having a narrow linewidth at an emission wavelength $\lambda_e$ and an arrangement for varying the emission wavelength $\lambda_e$. An optical path is provided for guiding the radiation to the optical sensor and for guiding a response radiation from the optical sensor. The apparatus has a detector for generating a response signal to the response radiation and an analysis module for fitting the response signal. More specifically, the analysis module determines the physical parameter from a fitting of the response signal rather than directly from the response signal. More precisely still, the analysis module performs curve fitting for fitting a best fit curve to the response signal and determines the physical parameter from the best fit curve.

Preferably, the apparatus uses a narrow linewidth laser as the source of radiation. For example, the source can be a tunable laser such as an External Cavity Diode laser (ECDL), a Distributed Bragg Reflector laser, a fiber laser or other tunable narrow linewidth laser.

In some embodiments the apparatus is further equipped with a tap, e.g., a directional coupler, a y-junction a beam splitter or some other suitable device for tapping the radiation. The tapped radiation is delivered to a wavelength meter for monitoring the emission wavelength $\lambda_e$. In fact, it is preferable that the wavelength meter be connected to the apparatus that varies emission wavelength $\lambda_e$ for purposes of providing feedback. In the preferred embodiment where the source is a laser, the apparatus that varies the emission wavelength $\lambda_e$ can be a laser tuner that exercises control over the laser by varying a parameter such as current, temperature or any other suitable parameter or their combination. In fact, in the preferred embodiment the laser tuner has a scanner for scanning the emission wavelength $\lambda_e$ or a sweeper for sweeping the emission wavelength $\lambda_e$. In some embodiments the optical sensor is a Bragg grating such as a Fiber Bragg Grating (FBG). In other embodiments optical sensors such as Fabry-Perot cavities are used. In either case a part of the optical path is preferably formed in an optical fiber. The FBG defines a Bragg wavelength $\lambda_B$ in accordance with the Bragg condition and reflects radiation when it equals the Bragg wavelength $\lambda_B$. In other words, reflected radiation is at the Bragg wavelength $\lambda_B$.

Furthermore, the invention provides a method for determining a physical parameter, e.g., an environmental effect such as temperature, strain and pressure by employing an optical sensor that is affected by the physical parameter. The optical sensor responds to incident radiation by varying a property of the response radiation. The property being varied can be any one or any combination of the following: transmittance, reflectance, absorbance and polarization.

In accordance with the method an optical sensor, e.g., a Fiber Bragg Grating or a Fabry-Perot element, is disposed in the optical path. A radiation emitted within a narrow linewidth at an emission wavelength $\lambda_e$ propagates along the optical path to the sensor to produce a response radiation. During operation the emission wavelength $\lambda_e$ is varied and a response signal is generated from the response radiation. The physical parameter is determined from a fitting of the response signal. The fitting preferably comprises a best curve fit and can employ an analysis method selected from among peak detection, Full Width Half Maximum (FWHM) determination and centroid detection. The fitting can use a fit selected from the group of polynomial fits, Lorentzian fits and Gaussian fits.

In some embodiments the emission wavelength $\lambda_e$ is varied continuously, e.g., it is swept. In other embodiments the emission wavelength $\lambda_e$ is varied discontinuously in accordance with a pattern, e.g., a scan pattern. The details of the invention are discussed in the detailed description with reference to the attached drawing figures.

BRIEF DESCRIPTION OF DRAWING FIGURES

DETAILED DESCRIPTION

Figure 1:
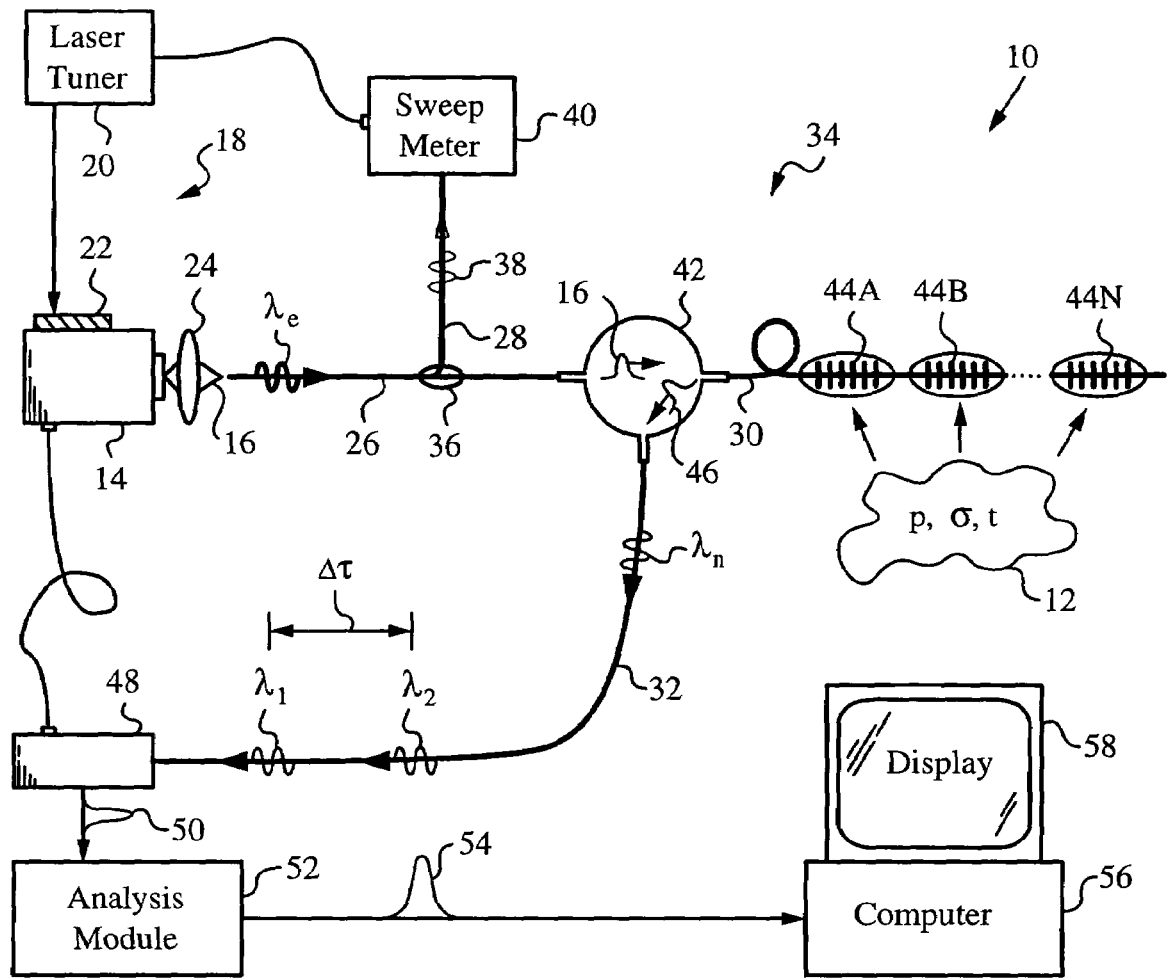
FIG. 1 is a diagram of an apparatus according to the invention.

FIG. 1 is a diagrammatic illustration of an apparatus 10 for determining a physical parameter 12 as envisioned by the present invention. Apparatus 10 has a source 14 for emitting a radiation 16. Source 14 emits radiation 16 that spans a narrow linewidth and has a high spectral density. In other words, radiation 16 has a very well-defined emission wavelength $\lambda_e$ and high output power. In fact, source 14 is selected such that the linewidth is narrow enough to not include wavelengths even a few hundredths of a nanometer different from emission wavelength $\lambda_e$. To satisfy these conditions, it is preferable to use as source 14 a narrow linewidth laser whose emission wavelength $\lambda_e$ is well-known and easily controllable. Examples of suitable lasers include tunable laser sources such as External Cavity Diode lasers (ECDLs), Distributed Bragg Reflector lasers, Fiber lasers and other tunable laser sources that can perform wavelength sweeps very rapidly while preserving steady, narrow linewidth emission. In the present embodiment source 14 is a low-noise ECDL with 1 dBm of output power and low amplified stimulated emission (ASE), e.g., 70 dB lower than the carrier.

Apparatus 10 has an arrangement 18 for varying emission wavelength $\lambda_e$ of ECDL 14. Arrangement 18 has a laser tuner 20 and a control mechanism 22 such as a drive current source. Of course, other control mechanisms 22 including temperature control mechanisms can be used. However, for rapid variation of emission wavelength $\lambda_e$ it is preferable to use drive current source 22. Laser tuner 20 controls current source 22 to vary emission wavelength $\lambda_e$ in a predetermined pattern that is either continuous or discontinuous. In fact, laser tuner 20 can be a scanner to produce a scan of wavelength $\lambda_e$ in predetermined portions of the spectrum, or a sweeper for producing a sweep of wavelength $\lambda_e$ across a predetermined wavelength range $\Delta\lambda$. In the present embodiment laser tuner 20 is a sweeper capable of producing a sweep rate of 100 nm/s and higher.

ECDL 14 has a lens 24 for in-coupling radiation 16 into a waveguide 26. Waveguide 26 is a first waveguide in a network 34 having waveguides 26, 28, 30, 32 for guiding radiation 16. Waveguides 26, 28, 30, 32 define an optical path for guiding radiation 16, but in general any suitable optical elements including mirrors, lenses, prisms and diffraction gratings can be used for this purpose and the medium of the optical path can be free space rather than a waveguide. In many embodiments, however, it is preferable to use waveguides such as optical fibers, e.g., single mode or multi-mode optical fibers. Hence, in the present embodiment waveguides 26, 28, 30 and 32 are optical fibers.

Fiber 28 branches off from fiber 26 at a tap or junction 36. Junction 36 is a directional coupler, but it could also be any suitable type of splitter including a y-junction. Junction 36 taps a fraction 38 of radiation 16 for monitoring a characteristic of radiation 16. In the present embodiment this characteristic is wavelength and fiber 28 is connected to a wavelength meter 40 for monitoring emission wavelength $\lambda_e$ of radiation 16. More precisely, since laser tuner 20 is a sweeper, wavelength meter 40 is a sweep meter for monitoring the sweep of emission wavelength $\lambda_e$ across wavelength range $\Delta\lambda$. Sweep meter 40 is connected to sweeper 20 to provide feedback, e.g., for adjusting the sweep. Preferably sweep meter 40 is a very accurate swept wavelength meter or a dynamic swept wavelength device that preserves its accuracy during the sweep in contrast to wavelength reference devices that perform only in "step and measure" situations.

A routing element 42 connects fibers 26, 30 and 32 such that radiation 16 propagates from fiber 26 to fiber 30, and any radiation returning from fiber 30 is guided to fiber 32. In this embodiment element 42 is a circulator. A person skilled in the art will recognize that other elements, including directional couplers can be used to achieve such guiding of radiation 16.

Apparatus 10 has a number of optical sensors 44A, 44B, . . . , 44N for producing a response radiation 46 when illuminated with radiation 16. In particular, sensors 44A, 44B, . . . , 44N each vary a property of radiation 16 as a function of physical parameters 12. The property of radiation 16 that can be varied can be transmittance, reflectance, absorbance or polarization. Sensors 44A, 44B, . . . , 44N that can vary these properties of radiation 16 include, among other, Fabry-Perot elements, etalons and Bragg gratings. In the present embodiment sensors 44A, 44B, . . . , 44N are Fiber Bragg Gratings (FBGs) and the property that is varied is their narrowband reflectance. Thus, when emission wavelength $\lambda_e$ of radiation 16 matches the narrowband reflectance of any particular sensor the response radiation 46 is a reflected radiation. More specifically, FBGs 44A, 44B, . . . , 44N have a spatially varying refractive index n that defines a Bragg wavelength $\lambda_B$ at which reflected radiation 46 is produced in accordance with the following equation:

$$\lambda_B = 2n\Lambda.$$

Since pitch $\Lambda$ and effective index n are very sensitive to changes in physical parameters 12, FBGs 44A, 44B, . . . , 44N are effective in monitoring them. Specifically, physical parameters 12 such as pressure p, strain σ and temperature t affect FBGs 44A, 44B, . . . , 44N by altering pitch $\Lambda$ and/or effective index n.

Reflected radiation 46 contains wavelengths $\lambda_1, \lambda_2, \ldots, \lambda_n$ corresponding to Bragg wavelengths $\lambda_B$ of FBGs 44A, 44B, . . . , 44N as altered by physical parameters 12. All reflected radiation 46 is guided to fiber 32 by circulator 42. A detector 48 is connected to fiber 32 for detecting reflected radiation 46 and generating a corresponding response signal 50. An analysis module 52 in communication with detector 48 receives response signal 50 for fitting and determining one or more physical parameters 12 from the fitted response signal 50. In the preferred embodiment detector 48 is a photodetector.

Module 52 of detector 48 uses an algorithm that performs an analysis and curve fitting. The objective of module 52 is to generate a best curve fit to or of response signal 50. Thus, analysis module 52 has a curve fitting module for fitting a best fit curve to response signal 50. The analysis can include an analysis method such as peak detection, Full Width Half Maximum (FWHM) determination or centroid detection. The curve fitting can be a fit such as a polynomial fit, a Lorentzian fit or a Gaussian fit. A computer 56 and a display 58 are connected to analysis module 52 for displaying the results, i.e., the values of physical parameters 12 determined by fitting response signals 50 obtained from radiation 46 reflected by FBGs 44A, 44B, . . . , 44N.

To operate apparatus 10 network 34 is distributed such that FBGs 44A, 44B, . . . , 44N are placed at locations where physical parameters 12 are to be monitored. In the present embodiment, fiber 30 is placed in a building structure such that successive FBGs 44A, 44B, . . . , 44N measure a strain σ at different locations in the building structure. In another embodiment, fiber 30 is placed on an airplane wing such that successive FBGs 44A, 44B, . . . , 44N measure stresses and strains experienced by the wing. In still another embodiment, fiber 30 is placed in an environment that experiences local temperature changes such that successive FBGs 44A, 44B, 44N measure these temperature changes.

During operation ECDL 14 emits narrow linewidth radiation 16 at emission wavelength $\lambda_e$ into fiber 26. Sweeper 20 controls control mechanism 22 such that emission wavelength $\lambda_e$ is swept over a wavelength range $\Delta\lambda$ at a high rate, e.g., 100 nm/s or faster. Fraction 38 of radiation 16 tapped with the aid of tap 36 is delivered to sweep meter 40. Measurement of this fraction by sweep meter 40 is fed back to sweeper 20. Thus, sweeper 20 can adjust its operation to ensure that the sweep is proceeding as desired, e.g., at 100 nm/s and at a high output power.

Radiation 16 propagates along the optical path to FBGs 44A, 44B, . . . , 44N through fiber 30 and undergoes reflection in accordance with the Bragg condition. Each one of FBGs 44A, 44B, . . . , 44N produces reflected radiation 46 at its instantaneous Bragg wavelength $\lambda_B$ as altered by strain σ. Thus, FBGs 44A, 44B, . . . , 44N produce reflected radiation 46 at wavelengths $\lambda_1, \lambda_2, \ldots, \lambda_n$ corresponding to their Bragg wavelengths $\lambda_B$ as altered by strain σ. To ensure this, sweeper 20 sweeps across wavelength range $\Delta\lambda$ containing wavelengths $\lambda_1, \lambda_2, \ldots, \lambda_n$.

Figure 2A:
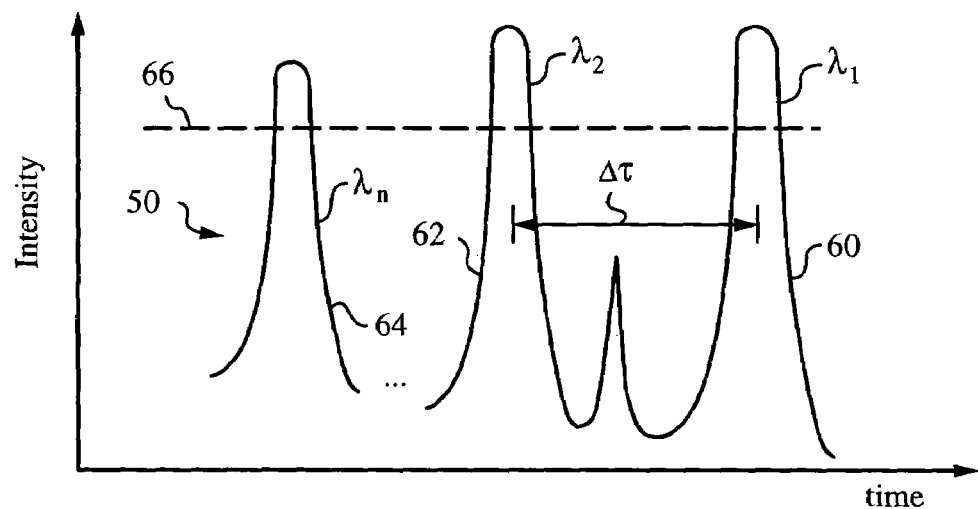
FIG. 2A is a graph illustrating an intensity variation detected by the detector of FIG. 1 during a scan.

Because of the wavelength sweep and because FBGs 44A, 44B, . . . , 44N are positioned at different locations, wavelengths $\lambda_1, \lambda_2, \ldots, \lambda_n$ of reflected radiation 46 are separated by certain time intervals. Wavelengths $\lambda_1$ and $\lambda_2$ are separated by a time interval $\Delta\tau$. Therefore, detector 48 produces response signal 50 in which peaks 60 and 62 corresponding to wavelengths $\lambda_1$ and $\lambda_2$ are separated by time interval $\Delta\tau$, as better illustrated in the graph of FIG. 2A.

Analysis module 52 receives response signal 50 and performs an analysis including peak detection by selecting a threshold level 66. All peaks with heights or intensities lower than threshold level 66 are ignored. Meanwhile, peaks 60, 62, 64 corresponding to wavelengths $\lambda_1, \lambda_2, \ldots, \lambda_n$ from FBGs 44A, 44B, . . . , 44N are further processed by analysis module 52.

Figure 2B:
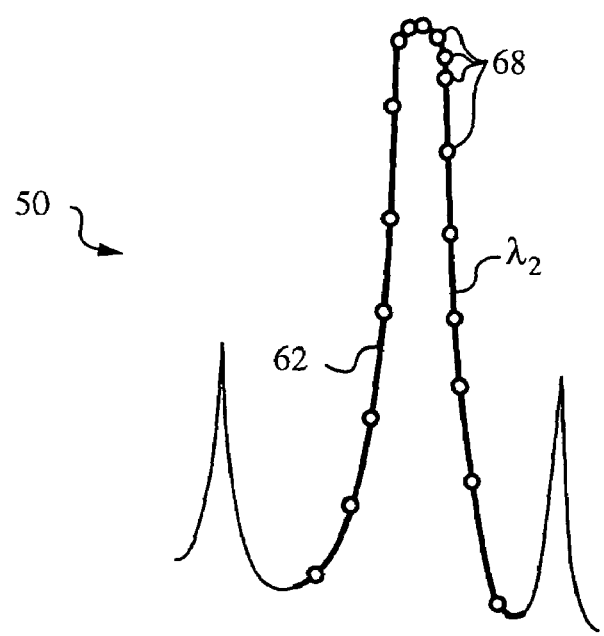
FIG. 2B is a diagram illustrating a step in the analysis of a response signal.
Figure 2C:
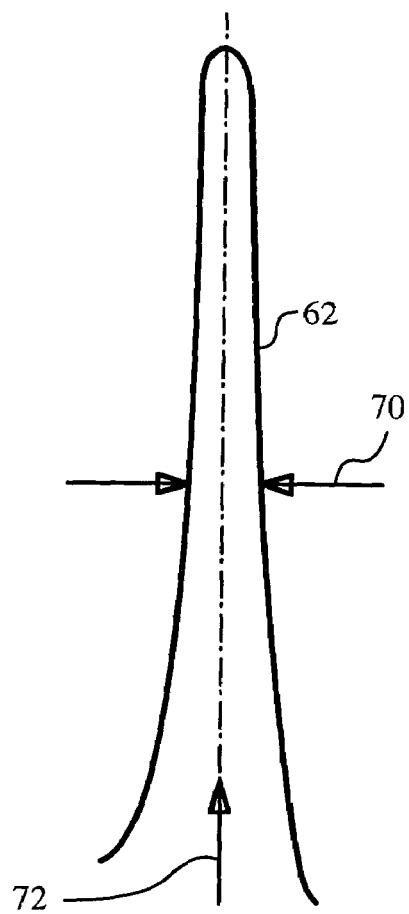
FIG. 2C is a diagram illustrating a number of analysis methods applied to the response signal of FIG. 2B.

Consider peak 62 corresponding to reflected radiation 46 from FBG 44B. Since it is above threshold level 66 it is further processed by module 52, as shown in FIG. 2B. Module 52 identifies or samples a number of data points 68 in evaluating peak 62. Then, module 52 applies algorithms for examining peak 62. The first algorithm applied is a Full Width Half Maximum (FWHM) determination to identify FWHM 70 of peak 62 as shown in FIG. 2C. Then, module 52 applies a centroid detection algorithm to identify a centroid 72 of peak 62.

Figure 3:
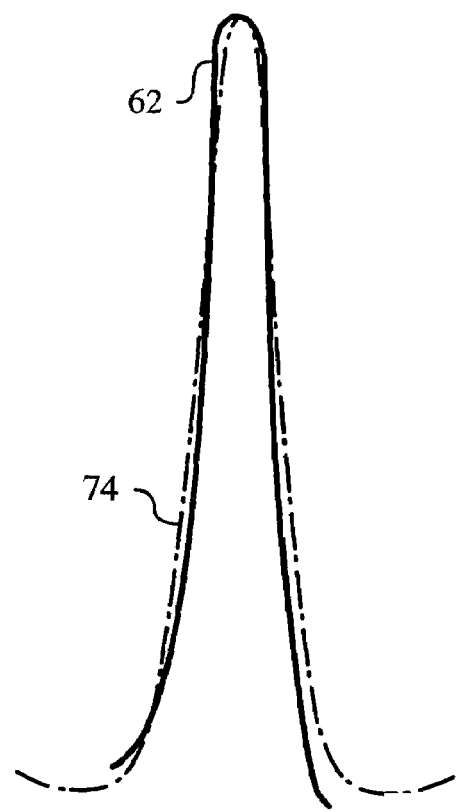
FIG. 3 is a diagram illustrating the fitting of the reflected signal with a best fit curve.

Based on the parameters determined with the algorithms module 52 then uses its a curve fitting module for fitting a best fit curve to peak 62 of response signal 50. The fit selected can be a polynomial fit, a Lorentzian fit or a Gaussian fit. In the present embodiment, module 52 uses a quadratic fit, as shown in FIG. 3. The quadratic fit produces a best fit curve 74 indicated in a dashed and dotted line. It is curve 74 that is then used by module 52 for determining physical parameter 12 affecting FBG 44B that produced peak 62 in response signal 50, rather than peak 62 itself. The result is sent to computer 56 for display on display 58. The remaining peaks contained in response signal 50 are treated analogously. It should be noted that the processing can be shared between computer 56 and module 52. For example, module 52 can deliver best fit curve 74 to computer 56 for determination of physical parameter 12 affecting FBG 44B.

In determining the most suitable fit module 52 strives to ensure that best fit curve 74 best overlaps the actual shape of the peak. Therefore, although the quadratic fit produces the best result in the present example, a Gaussian fit or a Lorentzian fit can be better for differently shaped peaks. Curve fitting provides not only information about the centroid or center of the shape or peak, but also about its height, width and the slope. This information can also be used by module 52. Furthermore, curve fitting should employ a large number of data points 68 such that sensitivity to noise is reduced and update rate is improved. Additional mathematical techniques for processing data points 68 can also be used, including mathematical transfers such as the Fast Fourier Transform (FFT).

Figure 4:
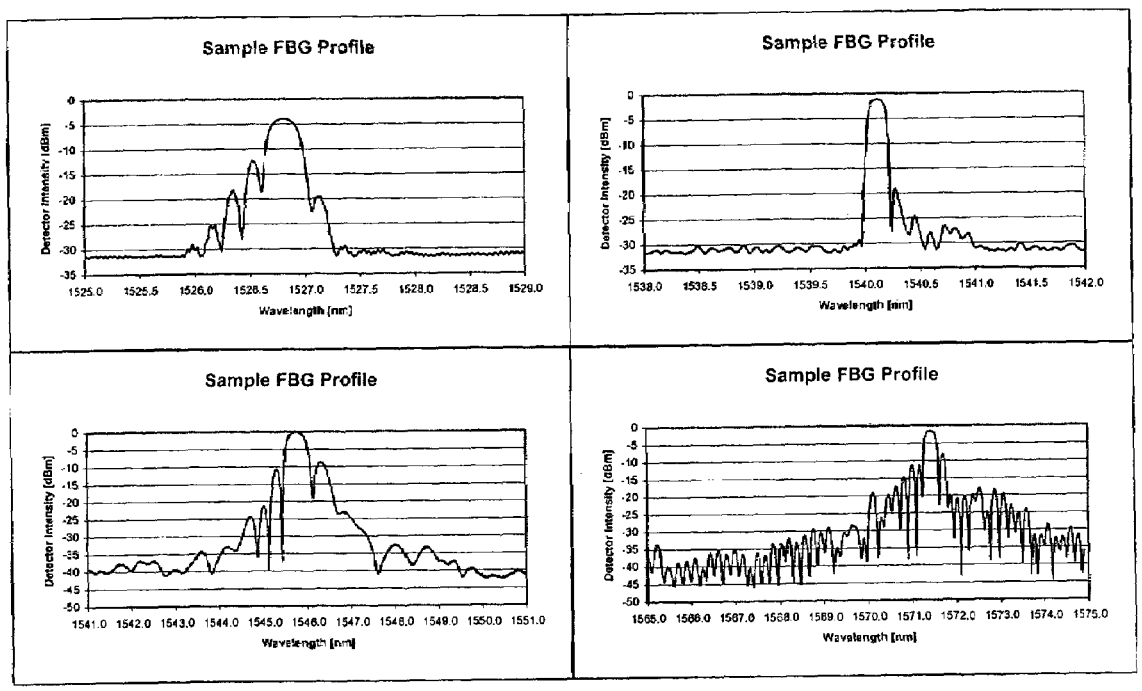
FIG. 4 are graphs of the response signal at four different Bragg wavelengths.

In the present embodiment laser tuner 20 is a sweeper that sweeps a wavelength range Δλ within which response signal 50 exhibits peaks. FIG. 4 illustrates four peaks in response signal 50 obtained from four FBGs at four different wavelengths. When the location of the peaks is known, laser tuner 20 can be a scanner that disregards portions of wavelength range Δλ where no peaks are expected. However, whether using a scanner or a sweeper it is important to cover the portions of wavelength range Δλ over which the Bragg wavelengths of FBGs 44A, 44B, . . . , 44N are expected to fluctuate in response to physical parameter 12. Additionally, the speed of the sweep or scan can be adjusted based on the time scales on which physical parameter 12 is to be observed.

It should be noted that apparatus 10 can be used in the transmission mode, such that response signal 50 is produced by a transmitted radiation rather than reflected radiation 46. In the same embodiment, the absorbance of FBGs 44A, 44B, . . . , 44N can also be measured. Alternatively, FBGs 44A, 44B, . . . , 44N can be replaced by polarization-altering optical sensors and a variation produced by physical parameter 12 in the polarization state of a reflected or transmitted radiation can be measured. The polarization state being measured can be a polarization angle, a general polarization state, e.g., circular, elliptical or linear, or even a degree of depolarization. In still other alternatives one can employ optical sensors that react to physical parameter 12 by changing a different property affecting the response light. Such properties can include scattering, refraction, direction of optical propagation or even time or speed of propagation of the response radiation.

The apparatus of invention can also be used when the optical path is free space and the sample is a gas sample. In those cases back-scattered radiation can be measured by the optical sensors and the response signal analyzed in accordance with the method of invention.

A person skilled in the art will recognize that the present invention admits of many alternative embodiments. Therefore, it should be judged in view of the appended claims and their legal equivalents.

The invention claimed is:

1. An apparatus for use with an optical sensor, said apparatus comprising:
   a source emitting radiation at an emission wavelength;
   a wavelength meter coupled to monitor said emission wavelength;
   means for varying said emission wavelength coupled to said wavelength meter;
   an optical path guiding said radiation to said optical sensor and guiding a response radiation from said optical sensor;
   a detector generating a response signal to said response radiation; and
   an analysis module which analyzes said response signal and determines therefrom a physical parameter by:
   detecting peaks in said response signal by applying a threshold level;
   identifying a full width half maximum of each peak;
   identifying a centroid of each peak from one full width half maximum; and
   making a fit to each peak.

2. The apparatus of claim 1, wherein said source is a laser.

3. The apparatus of claim 2, wherein said laser is selected from the group consisting of External Cavity Diode lasers, Distributed Bragg Reflector lasers, and fiber lasers.

4. The apparatus of claim 1, wherein said fit is a best fit curve.

5. The apparatus of claim 1, wherein said optical sensor is selected from the group consisting of Bragg Grating and Fabry-Perot elements.

6. The apparatus of claim 5, wherein said optical path comprises an optical fiber and said Bragg Grating is a Fiber Bragg Grating.

7. The apparatus of claim 1, wherein said means for varying said emission wavelength comprises a laser tuner.

8. The apparatus of claim 7, wherein said laser tuner comprises a scanner for scanning said emission wavelength.

9. The apparatus of claim 7, wherein said laser tuner comprises a sweeper for sweeping said emission wavelength.

10. The apparatus of claim 1, wherein said optical path comprises a waveguide.

11. The apparatus of claim 1, further comprising a tap for tapping said radiation and coupling said radiation to said wavelength meter for monitoring said emission wavelength.

12. A method for determining a physical parameter affecting an optical sensor, said method comprising:
   emitting a radiation having an emission wavelength;
   providing an optical path for said radiation to said optical sensor and for a response radiation from said optical sensor;
   varying said emission wavelength;
   generating a response signal from said response radiation; and
   determining said physical parameter by:
   detecting peaks in said response signal by applying a threshold level;
   identifying a full width half maximum of each peak;
   identifying a centroid of each peak from the full width half maximum; and
   making a fit to each peak.

13. The method of claim 12, wherein said optical sensor produces said response radiation by a varying a property of said radiation, said property being selected from the group consisting of transmittance, reflectance, absorbance and polarization.

14. The method of claim 12, wherein said emission wavelength is varied continuously.

15. The method of claim 14, wherein said emission wavelength is swept.

16. The method of claim 12, wherein said emission wavelength is varied discontinuously.

17. The method of claim 16, wherein said emission wavelength is scanned.

18. The method of claim 12, wherein said making a fit comprises making a fit selected from the group consisting of a polynomial fit, a Lorentzian fit and a Gaussian fit.

19. The method of claim 12, wherein said physical parameter is selected from the group consisting of temperature, strain and pressure.

20. The method of claim 12, further comprising tapping said radiation and monitoring said emission wavelength.

* * * * *